United States Patent [19]

Goebels

[11] Patent Number: 5,647,282
[45] Date of Patent: Jul. 15, 1997

[54] FLEXIBLE SHEATING FOR CONNECTING CORRIDORS

[75] Inventor: André Goebels, Kassel, Germany

[73] Assignee: Hubner Gummi-und Kunststoff GmbH, Kassel, Germany

[21] Appl. No.: 588,252

[22] Filed: Jan. 18, 1996

[30] Foreign Application Priority Data

Jan. 19, 1995 [DE] Germany .......................... 295 00 695.1

[51] Int. Cl.⁶ .................................................. B61D 17/20
[52] U.S. Cl. .................. 105/18; 105/15; 105/20; 280/403
[58] Field of Search ............... 105/8.1, 15, 18, 105/20; 280/403

[56] References Cited

U.S. PATENT DOCUMENTS

| | | | |
|---|---|---|---|
| 4,257,640 | 3/1981 | Wiley | 105/1.1 |
| 4,858,535 | 8/1989 | Bechu et al. | 105/15 |
| 4,860,665 | 8/1989 | Schmidt | 105/18 |
| 4,869,178 | 9/1989 | Bechu et al. | 105/15 |
| 5,060,578 | 10/1991 | Carimentrand | 105/18 |
| 5,456,186 | 10/1995 | Hubner | 105/18 |
| 5,515,791 | 5/1996 | Britzke et al. | 105/8.1 |

FOREIGN PATENT DOCUMENTS

| | | |
|---|---|---|
| 3035159 | 4/1982 | Germany . |
| 3634641 | 4/1988 | Germany . |
| 0631539 | 11/1949 | United Kingdom . |

*Primary Examiner*—S. Joseph Morano
*Attorney, Agent, or Firm*—Thomas R. Vigil

[57] ABSTRACT

Flexible sheating for connecting corridors, and, more particularly a cover for the side wall of a connecting corridor between two connected vehicles, whereas the cover (1) is designed in one piece and has a varying flexibility over the expense of the cover (1).

5 Claims, 1 Drawing Sheet

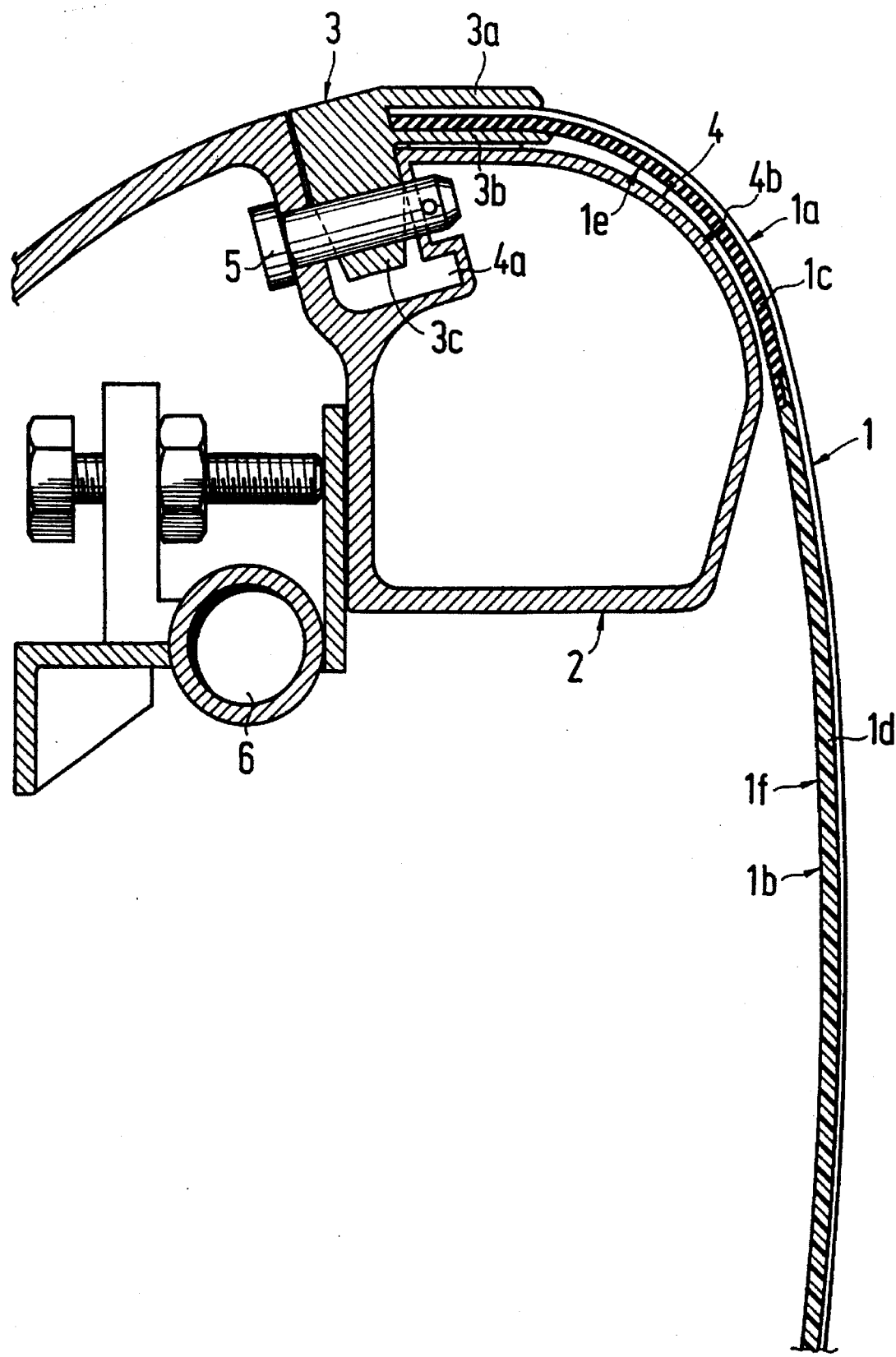

FLEXIBLE SHEATING FOR CONNECTING CORRIDORS

BACKGROUND OF THE INVENTION

1. Field of the Invention

The present invention relates to a flexible sheating for connecting corridors, and, more particularly to a cover for the side wall of a connecting corridor between two connected vehicles.

In the following, the invention is explained more in detail with the help of the drawings.

2. Description of the related art including information disclosed under 37 CFR §§1.97–1.99

U.S. Pat. No. 5,515,791 discloses an inner sheating of a connecting corridor between two vehicles and, more particularly of a connecting corridor with telescopic shock absorber, whose side wall cover is a supply yielding plate, vaulted around the vertical axis towards the center of the connecting corridor. In order to be able to yield in case of a height difference between the vehicles, it has been foreseen that the side wall cover is connected to the coach body by elasticated elements. The elasticated elements particularly used are connecting elements made of rubber.

The HÜBNER U.S. Pat. No. 5,456,186 discloses a vaulted vestibule connection of polymere materials comprised of either connected strips or one-piece construction. The side walls are composed of a harder layer in the central region with softer contiguous layers at the top and bottom edges. Thereby, HÜBNER uses selective radiation treatment as the exclusive means of accomplishing this function.

The WILEY U.S. Pat. No. 4,257,640 shows the use of varying the thickness of articulated connection bellows, to be well-known in the art for use in closing the passage between articulated vehicle bodies, in order to provide an inexpensive way to tailor the flexural properties or the bellows.

In comparison to the elasticated elements, the side wall cover is relatively stiff. This makes the connection expensive, as separate connecting elements are necessary.

SUMMARY OF THE INVENTION

The object of the present invention is therefore to provide a sheating, more particularly a cover for the side wall of a connecting corridor, which is easy and inexpensive to manufacture, and which is able to yield to all occurring interacting movements of the vehicles.

A solution of this object is that the cover is made of one piece and has a varying flexibility over the surface of the cover, i.e., that the side wall cover is much softer and thus more yielding on its long sides or on its edges, that's to say where it is connected to the coach body, than in its center.

A cover as mentioned above has particularly several layers, particularly two layers, whereas the cover consists of one harder and less elastic layer and of one softer and elastic one. The harder layer can hereby be made of a polycarbonate, duromer or of a thermoplastic material. For the softer layer, the use of rubber has particularly been thought of. The extent of flexibility depends hereby on the thickness of the material for the different layers. An advantage of the present invention is that the cover is designed in such a way that a continuous supporting layer of stiffer material is put on top of an additional layer. This additional layer has on its edges, a stepped layer of soft, flexible material (e.g. rubber), and in its center again a layer of stiff material (e.g. polycarbonate or glass fiber reinforced synthetic resin). The graded design of the softer layer on the edges improves the connection with the stiffer layer in the center of the cover. Moreover, the gradation creates a transitional zone between the softer side wall and the harder center, thus avoiding snapping when bent. How far the softer layer reaches towards the center of the cover depends on the particular use, that's to say on the extent of a necessary distortion of the cover. For decoration, the inner side of the cover is provided with a foil.

A cover with varying flexibility over its expanse can also be obtained in providing the expanse of the cover with varying thickness. In such a case and using the same material, the cover on its long sides is less thick than in its center. In order to guarantee an extension of the side wall cover when driving curves, the side wall cover has been vaulted and thus tightened in advance i.e., that the side wall cover forms a radius around the longitudinal axis when mounted.

In the following description, the cover of the present invention is explained in more detail in conjunction with the single FIGURE of the drawings.

BRIEF DESCRIPTION OF THE DRAWINGS

The single FIGURE of the drawings is a cross-sectional view, with portions broken away, of the cover constructed according to the teachings of the present invention.

DESCRIPTION OF THE PREFERRED EMBODIMENT(S)

As shown in the FIGURE, the side wall cover is held by the support 2. Said support 2 includes a clamp tip 3, whereas said side wall cover is clamped by the two legs 3a, 3b of said clamp tip 3. Said support 2 includes moreover a cylindrical frame 4, holding removably said clamp tip 3. Therefore, said frame 4 has a groove 4a, into which the extension 3c of the clamp tip 3 reaches, whereas a pin is provided for fastening the extension 3c in the groove 4a. The cylindrical frame 4 is linked to the spring hinge 6 and can be swivelled around, whereas said spring hinge 6 is linked to the coach body (not shown).

The side wall cover 1 has a varying flexibility over its surface. In the area of the cylindrical frame 4, and here particularly within the vault 4b of the frame, the side wall cover is flexibly designed. This is mainly achieved by a cover structure characterized by following features: the cover has a supporting layer that is made of stiff material, e.g. polycarbonate or glass fiber reinforced synthetic resin; parallel to this layer, a second layer 1b is provided, having on its edges 1e a soft, flexible insert 1c, whereas said insert is stepped in such a way that in the center if, the central layer 1d of harder material can be positively locked according to its shape by the insert 1c. It has to be recorded that a such designed side wall cover with its elastical design on its long sides is able to yield to all occurring driving movements of two hinge-linked vehicles.

From the foregoing description, it will be apparent that the flexible sheating for connecting corridors of the present invention has a number of advantages, some of which have been described above and others of which are inherent in the invention. Also it will be understood that modifications can be made to the flexible sheating for connecting corridors described above without departing from the teachings of the present invention. Accordingly, the scope of the invention is only to be limited as necessitated by the accompanying claims.

I claim:

1. Flexible sheeting for connecting corridors, comprising a cover connecting successive sections of a train of vehicles together, where the cover comprises a continuous outer harder layer, and a second layer which is parallel to the first harder layer and is more flexible in the area of cover edge portions, which more flexible second layer is comprised of an insert portion attached to a central portion of the second layer, such that the central portion of the cover is less flexible than the edge portions where it is adapted to connect to the vehicles.

2. Cover according to claim 1, wherein the insert (1c) is graded towards the center of the cover, thereby positively locking the central portion (1d) made of stiffer material.

3. Cover according to claim 1, wherein the harder layer (1a, 1d) is made of a polycarbonate, duromer or thermoplastic.

4. Cover according to claim 1, wherein the insert (1c) is made of a rubber material.

5. Cover according to claim 1, wherein the cover (1) is vaulted.

* * * * *